Aug. 21, 1923.
W. J. DONALDSON
PICTURE SLIDE
Filed May 5, 1922
1,465,353
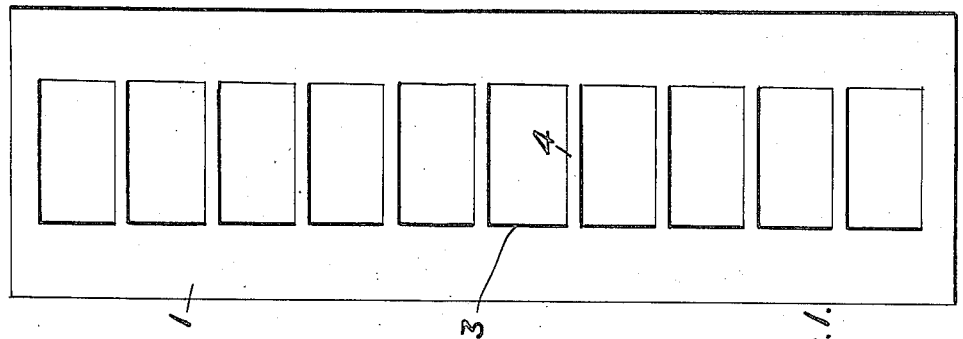
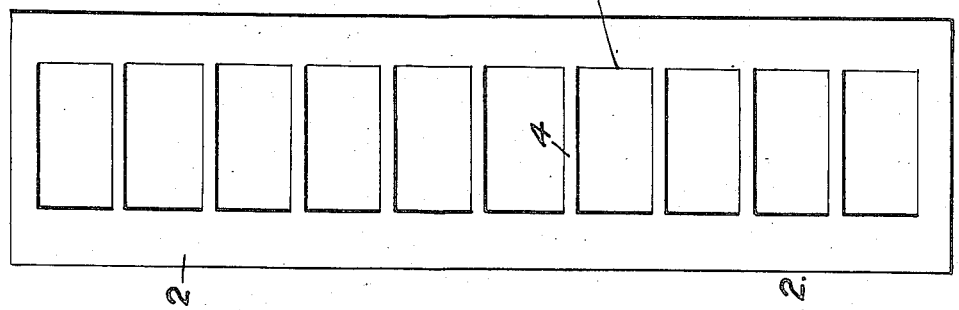
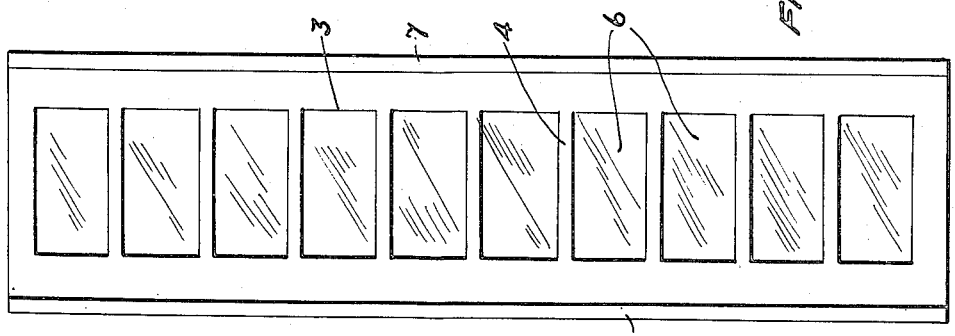
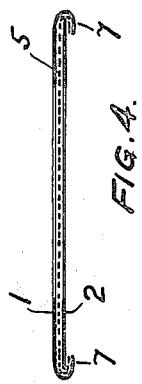
WITNESS:
INVENTOR
William J. Donaldson
BY
Augustus B. Stoughton
ATTORNEY.

Patented Aug. 21, 1923.

1,465,353

UNITED STATES PATENT OFFICE.

WILLIAM J. DONALDSON, OF PHILADELPHIA, PENNSYLVANIA.

PICTURE SLIDE.

Application filed May 5, 1922. Serial No. 558,718.

*To all whom it may concern:*

Be it known that I, WILLIAM J. DONALDSON, a citizen of the United States, residing at Philadelphia, in the county of Philadelphia and State of Pennsylvania, have invented a new and useful Improvement in Picture Slides, of which the following is a specification.

The invention relates to picture slides such as are used for exhibition in magic lanterns in connection with talking machines and such, for example, as are illustrated and described in my application for Letters Patent, Serial No. 458,825, although the invention is not confined to the slide feed mechanism there shown or to any particular slide feed mechanism.

The succeeding pictures are on films and the films are in frames and the films tend to warp thus getting the pictures out of focus, and the films are exposed to accidental rupture.

The principal object of the present invention is to prevent warping of the films or at any rate to confine such warping to individual pictures and to confine the effect of accidental rupture to individual pictures.

To these and other ends hereinafter set forth the invention, generally stated, comprises a slide for picture exhibitors comprising in combination front and back ladder-like plates having their openings and bars in confronting relation, a picture film arranged between the plates with individual pictures opposite the openings, and the edges of the films and plates being crimped for co-operation with the bars to hold the films flat and localize injury to the pictures. The invention also comprises the improvements to be presently described and finally claimed, and in the description reference will be made to the accompanying drawings forming part hereof and in which Figure 1 is a face view of one of the plates.

Fig. 2 is a like view of the other plate.

Fig. 3 is a like view of a slide embodying features of the invention, and

Fig. 4 is a transverse sectional view of Fig. 3 drawn to an enlarged scale.

In the drawings 1 and 2 are ladder-like plates having openings 3 and bars 4. The plate 2 for identification may be referred to as a front plate and the plate 1 as a back plate but of course the nomenclature is immaterial. The openings 3 and the bars 4 are in confronting relation and a picture film 5 is arranged between the plates 1 and 2 with individual pictures 6 opposite the openings. The edges 7 of the film and plates are crimped.

By the described construction the film is held flat not only by the crimping but also by the bars which overlie its surface and this warping of the film is opposed with the result that the pictures remain in focus. If the film is ruptured, for example, by the finger of the operator or by some other accident, the rupture is confined to or localized at one picture by the bars or ladder-like construction.

I claim:

A slide for picture exhibitors comprising in combination ladder-like plates having openings and bars in confronting relation, a picture film arranged between the plates with individual pictures opposite the openings, and the edges of the film and plates being crimped for co-operation with the bars in holding the film flat and in localizing injury to the pictures.

WILLIAM J. DONALDSON.